(12) United States Patent
Judd et al.

(10) Patent No.: US 10,241,658 B2
(45) Date of Patent: Mar. 26, 2019

(54) INFORMATION PROCESSING APPARATUS, NON-TRANSITORY COMPUTER-READABLE RECORDING MEDIUM WITH INFORMATION PROCESSING PROGRAM RECORDED THEREON, AND INFORMATION PROCESSING METHOD

(71) Applicant: KYOCERA Document Solutions Inc., Osaka (JP)

(72) Inventors: Isaac Judd, Osaka (JP); Yoshihisa Tanaka, Osaka (JP); Tetsuya Nishino, Osaka (JP)

(73) Assignee: KYOCERA Document Solutions Inc., Tamatsukuri, Chou-ku, Osaka (JP)

( * ) Notice: Subject to any disclaimer, the term of this patent is extended or adjusted under 35 U.S.C. 154(b) by 90 days.

(21) Appl. No.: 15/491,282

(22) Filed: Apr. 19, 2017

(65) Prior Publication Data

US 2017/0315708 A1 Nov. 2, 2017

(30) Foreign Application Priority Data

Apr. 28, 2016 (JP) .................................. 2016-091230
Apr. 28, 2016 (JP) .................................. 2016-091231

(51) Int. Cl.
*G06F 3/0482* (2013.01)
*G06F 3/0484* (2013.01)
*G06F 3/0488* (2013.01)

(52) U.S. Cl.
CPC ........ *G06F 3/04842* (2013.01); *G06F 3/0482* (2013.01); *G06F 3/0484* (2013.01); *G06F 3/04886* (2013.01); *G06F 2203/04803* (2013.01)

(58) Field of Classification Search
CPC ............. G06F 3/04845; G06F 3/04883; G06F 3/04886; G06F 3/04817; G06F 3/04842; G06F 3/0482; G06F 3/0484
See application file for complete search history.

(56) References Cited

U.S. PATENT DOCUMENTS 5,675,755 A * 10/1997 Trueblood ............ G06F 3/0481
715/791
6,025,841 A *  2/2000 Finkelstein ........... G06F 3/0481
715/803

(Continued)

FOREIGN PATENT DOCUMENTS

JP     H09-218772 A    8/1997
JP     2000-194474 A   7/2000

*Primary Examiner* — William L Bashore
*Assistant Examiner* — Gregory A Distefano
(74) *Attorney, Agent, or Firm* — IP Business Solutions, LLC

(57) ABSTRACT

An information processing apparatus includes a display section, a storage section, and a control unit. When accepting a predetermined gesture under a gesture acceptance control, the control unit allows the storage section to store window information indicating a size and a position of a window being displayed on the display section, creates an icon associated with a file being displayed in the window, and allows the display section to display the icon. When accepting a launch gesture on the icon under the gesture acceptance control, the control unit retrieves the window information from the storage section and allows the display section to display a window for displaying the file associated with the icon in the size and position indicated by the window information.

13 Claims, 15 Drawing Sheets

(56) References Cited

U.S. PATENT DOCUMENTS

| | | | |
|---|---|---|---|
| 8,490,002 B2* | 7/2013 | Fai | G06F 1/1639 |
| | | | 345/173 |
| 8,549,429 B2* | 10/2013 | Tsuruta | G06F 3/0488 |
| | | | 715/767 |
| 9,658,732 B2* | 5/2017 | Ording | G06F 3/0481 |
| 2003/0076340 A1* | 4/2003 | Hatori | G06F 3/04845 |
| | | | 345/699 |
| 2008/0244444 A1* | 10/2008 | Bauman | G06F 9/451 |
| | | | 715/806 |
| 2010/0281384 A1* | 11/2010 | Lyons | G06F 3/048 |
| | | | 715/723 |
| 2011/0167368 A1 | 7/2011 | Murakami et al. | |
| 2011/0296043 A1* | 12/2011 | Sutton | G06Q 10/10 |
| | | | 709/229 |
| 2013/0047118 A1* | 2/2013 | Hooper | G06F 3/0481 |
| | | | 715/790 |
| 2015/0089442 A1* | 3/2015 | Kang | G06F 3/0488 |
| | | | 715/788 |
| 2015/0234558 A1 | 8/2015 | Ichikawa et al. | |

* cited by examiner

Fig.3

| FILE | WINDOW INFORMATION | |
| --- | --- | --- |
| | COORDINATE AT TOP LEFT CORNER | COORDINATE AT BOTTOM RIGHT CORNER |
| FILE F1 | Xa1, Ya1 | Xb1, Yb1 |
| FILE F2 | Xa2, Ya2 | Xb2, Yb2 |
| FILE F3 | Xa3, Ya3 | Xb3, Yb3 |
| FILE F4 | Xa4, Ya4 | Xb4, Yb4 |
| | | |

103

INFORMATION PROCESSING APPARATUS, NON-TRANSITORY COMPUTER-READABLE RECORDING MEDIUM WITH INFORMATION PROCESSING PROGRAM RECORDED THEREON, AND INFORMATION PROCESSING METHOD

INCORPORATION BY REFERENCE

This application claims priority to Japanese Patent Applications No. 2016-091230 filed on Apr. 28, 2016, and No. 2016-091231 filed on Apr. 28, 2016, the entire disclosures of which are incorporated herein by reference.

BACKGROUND

The present disclosure relates to information processing apparatuses, non-transitory computer-readable recording media with an information processing program recorded thereon, and information processing methods.

In an information processing apparatus, such as a PC (personal computer), a window for displaying the contents of a file stored in a storage section is displayed on a display section. The window displayed on the display section can be changed in size and position. The user generally does work after adjusting the size and position of the window according to the user's preference.

SUMMARY

A technique improved over the aforementioned technique is proposed as one aspect of the present disclosure.

An information processing apparatus according to an aspect of the present disclosure includes a display section, a storage section, and a control unit. The control unit includes a processor and performs, when the processor operates in accordance with an operation program, a gesture acceptance control for accepting a user's gesture on the display section and a processing control for executing processing corresponding to the gesture accepted under the gesture acceptance control. Furthermore, (i) when accepting a predetermined gesture under the gesture acceptance control, the control unit allows the storage section to store window information indicating a size and a position of a window being displayed on the display section, creates an icon associated with a file being displayed in the window, and allows the display section to display the icon, and (ii) when accepting a launch gesture on the icon under the gesture acceptance control, the control unit retrieves the window information from the storage section and allows the display section to display a window for displaying the file associated with the icon in the size and position indicated by the window information.

A non-transitory computer-readable recording medium according to another aspect of the present disclosure contains an information processing program recorded thereon, the information processing program allowing a computer to function as: a gesture acceptance section that accepts a user's gesture on a display section; and a processing section that executes processing corresponding to the gesture accepted by the gesture acceptance section. Furthermore, (i) when the gesture acceptance section accepts a predetermined gesture, the information processing program allows the computer to function so that the processing section allows the storage section to store window information indicating a size and a position of a window being displayed on the display section, creates an icon associated with a file being displayed in the window, and allows the display section to display the icon, and (ii) when the gesture acceptance section accepts a launch gesture on the icon, the information processing program allows the computer to function so that the processing section retrieves the window information from the storage section and allows the display section to display a window for displaying the file associated with the icon in the size and position indicated by the window information.

An information processing method according to still another aspect of the present disclosure is an information processing method using an information processing apparatus including a display section and a storage section and includes: a gesture acceptance step of accepting a user's gesture on the display section; and a processing step of executing processing corresponding to the gesture accepted in the gesture acceptance step.

Furthermore, (i) in the processing step after a predetermined gesture is accepted in the gesture acceptance step, the storage section stores window information indicating a size and a position of a window being displayed on the display section, an icon associated with a file being displayed in the window is created, and the display section displays the icon, and (ii) in the processing step after a launch gesture on the icon is accepted in the gesture acceptance step, the window information is retrieved from the storage section and the display section displays a window for displaying the file associated with the icon in the size and position indicated by the window information.

BRIEF DESCRIPTION OF THE DRAWINGS

FIG. 3 is a table showing an example of a data structure in a storage section.

DETAILED DESCRIPTION

Hereinafter, a description will be given of an information processing apparatus, a recording medium with an information processing program recorded thereon, and an information processing method, each according to one embodiment of the present disclosure, with reference to the drawings.

First Embodiment

Figure 1:
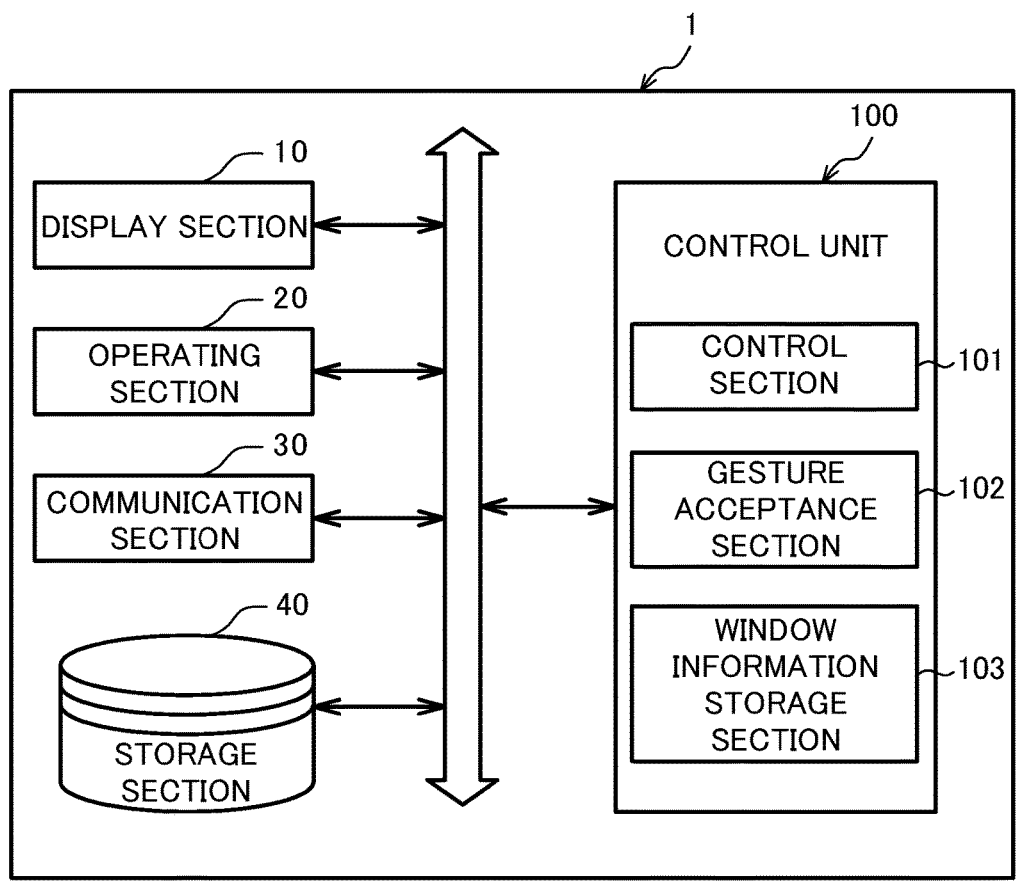
FIG. 1 is a functional block diagram schematically showing an essential internal configuration of an information processing apparatus according to a first embodiment of the present disclosure.

FIG. 1 is a functional block diagram schematically showing an essential internal configuration of an information processing apparatus according to a first embodiment of the present disclosure into which an information processing program is installed. The information processing apparatus 1 is an electronic apparatus, such as a personal computer, and includes a display section 10, an operating section 20, a communication section 30, a storage section 40, and a control unit 100. These components are capable of sending and receiving data or signals to and from each other via a CPU (central processing unit) bus.

Figure 2A:
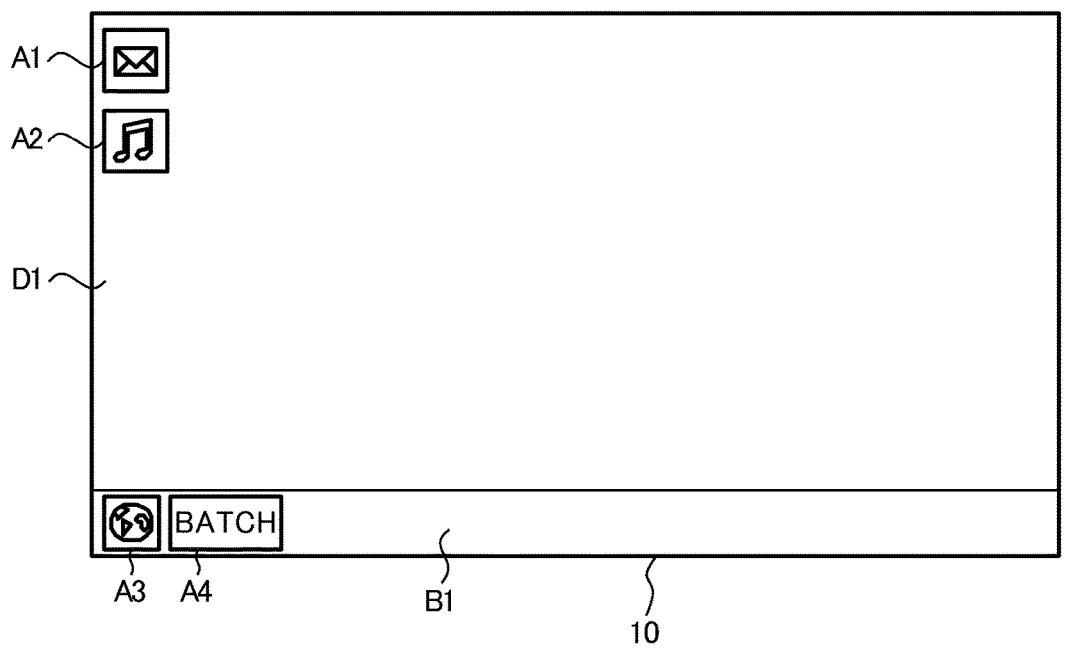
FIGS. 2A and 2B are views showing examples of an operation screen displayed on a display section.
Figure 2B:
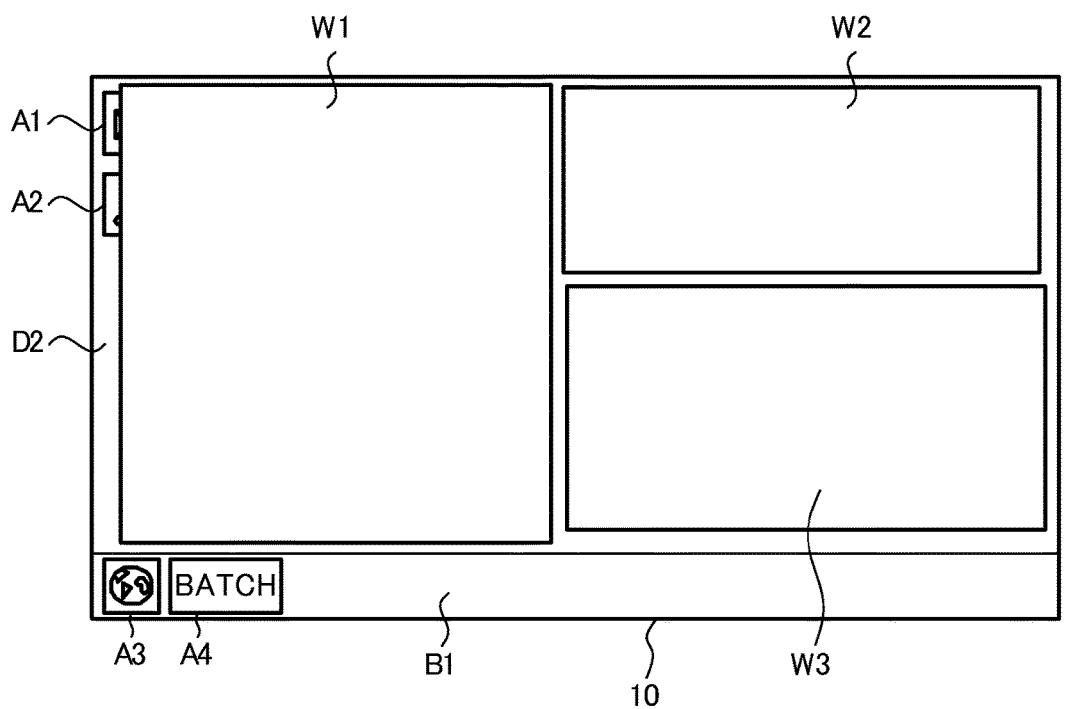

The display section 10 is formed of a liquid crystal display (LCD), an organic light-emitting diode (OLED) display or the like. As shown in FIGS. 2A and 2B, the display section 10 displays an operation screen D1 on which a plurality of icons A1 to A4 are arranged or displays an operation screen D2 on which the plurality of icons A1 to A4 and a plurality of windows W1 to W3 are arranged. The icons A1, A2 are arranged vertically downward from the top left of the screen and the icons A3, A4 are arranged horizontally rightward from the left end on a task bar B1 located at the bottom of the screen. The term window used herein refers to a screen for displaying execution results obtained when the control unit 100 executes various programs stored in the storage section 40. For example, the "window" corresponds to: (1) a Web page display screen as an execution result obtained when the control unit 100 executes an Internet browser program; (2) a folder display screen as an execution result obtained when the control unit 100 executes a file browser program; or (3) a document file display screen as an execution result obtained when the control unit 100 executes a word processing program.

The icons A1 to A4 are associated with respective different predetermined functions possessed by the information processing apparatus 1 and given graphic images representing their respective functions. For example, the icon A1 is associated with a mail function. The icon A4 is associated with a batch execution function for creating an icon for batch-executing two or more files being displayed in windows on the display section 10.

Furthermore, the display section 10 displays responses, data results, and so on from the control unit 100 and is provided with a touch panel function by which the user can touch an image or the like displayed on the screen to operate the information processing apparatus 1.

The operating section 20 is a mouse and/or a keyboard that accepts various user's instructions on various operations and processing executable on the information processing apparatus 1.

The communication section 30 is a communication interface including an unshown communication module, such as a LAN (local area network) chip. The information processing apparatus 1 is connected via a network to other information processing apparatuses, such as PCs, to send and receive data to and from the connected PCs through the communication section 30.

The storage section 40 is a large storage device, such as an HDD (hard disk drive).

The control unit 100 is formed of a CPU, a RAM (random access memory), a ROM (read only memory), and so on. When an information processing program stored in the above ROM or the storage section 40 is executed by the above CPU, the control unit 100 functions as a control section 101, a gesture acceptance section 102, and a window information storage section 103. Alternatively, each section of the control unit 100 may not be implemented by the operation of the control unit 100 in accordance with the above information processing program but may be constituted by a hardware circuit.

The window information storage section 103 allows the storage section 40 to store window information indicating the size and position of each window. FIG. 3 is a table showing an example of a data structure which the window information storage section 103 allows the storage section 40 to store, wherein the table stores, in association with each file, the coordinate points at the top left corner and the bottom right corner of the associated window which can specify the size and position of the window.

The control section 101 governs the overall operation control of the information processing apparatus 1. The control section 101 is connected to the display section 10, the operating section 20, the communication section 30, the storage section 40, and so on and performs the operation control of the above components connected thereto and signal or data transfer to and from the components.

The control section 101 particularly acts as a processing section that executes processing corresponding to a gesture accepted by a gesture acceptance section 102 to be described hereinafter. For example, when the user inputs a gesture for selecting the icon A1 shown in FIG. 2 using the touch panel function provided in the display section 10 or through the operating section 20 and the gesture acceptance section 102 accepts the selection gesture, such as a touch gesture on the icon A1, the control section 101 performs the mail function associated with the icon A1. Specifically, the control section 101 executes a mail program stored in the storage section 40 or the like.

Furthermore, the control section 101 is capable of allowing the display section 10 to display, in the form of a window, the contents of a file stored in the storage section 40. For example, when a document file created using a word processing program, such as Word by Microsoft Corporation, is executed, the control section 101 allows the display section 10 to display the contents of the document file in the form of a window.

The gesture acceptance section 102 identifies a user's gesture input by the user, based on a detection signal output from the display section 10 provided with the touch panel function or from the operating section 20. Then, the gesture acceptance section 102 accepts the identified user's gesture and outputs a control signal corresponding to the user's gesture to the control section 101 and so on.

Figure 4:
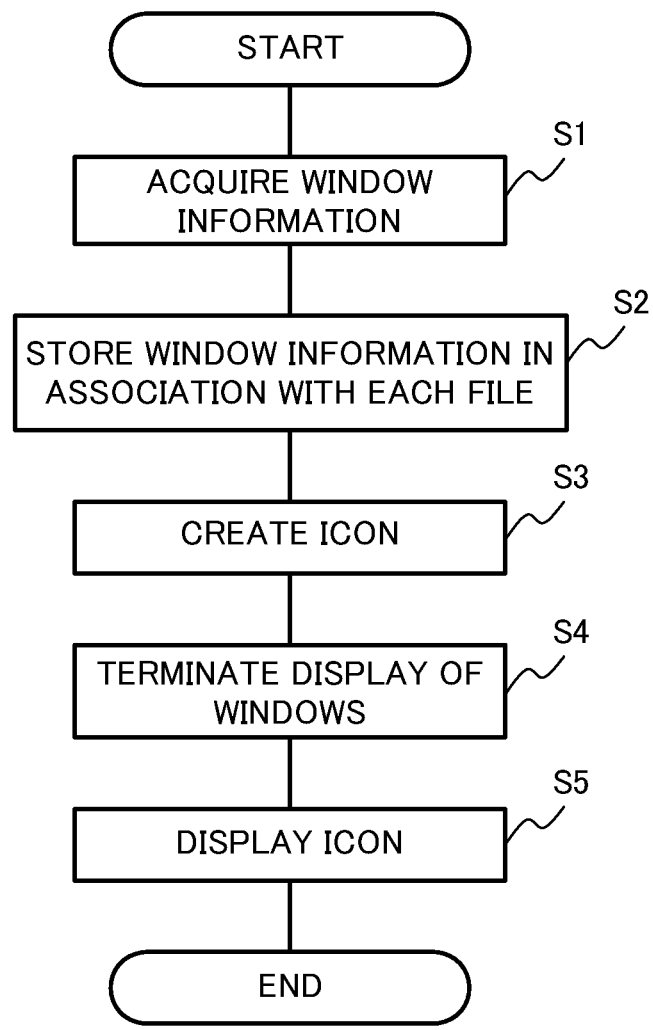
FIG. 4 is a flowchart showing a processing operation to be performed by a control unit of the information processing apparatus.

Next, a description will be given of operation of the information processing apparatus 1 having the above configuration. FIG. 4 is a flowchart showing a processing operation when the information processing program is executed by the control unit 10 of the information processing apparatus 1. The case where this processing operation is performed is the case where the gesture acceptance section 102 accepts a launch gesture (the predetermined gesture) on the icon A4 being displayed on the display section 10. Herein, for ease of explanation, the description will be given taking as an example the case where the windows W1 to W3 are displayed as shown in FIG. 2B.

When the gesture acceptance section 102 accepts a launch gesture on the icon A4, the control section 101 acquires window information indicating the sizes and positions of the windows W1 to W3 (specifically, coordinate points at the top left corner and bottom right corner of each window W1 to W3) being displayed on the display section 10 (S1) and allows the storage section 40 to store the acquired respective pieces of window information on the windows W1 to W3 in association with the respective files being displayed in the windows W1 to W3 (S2).

Figure 5:
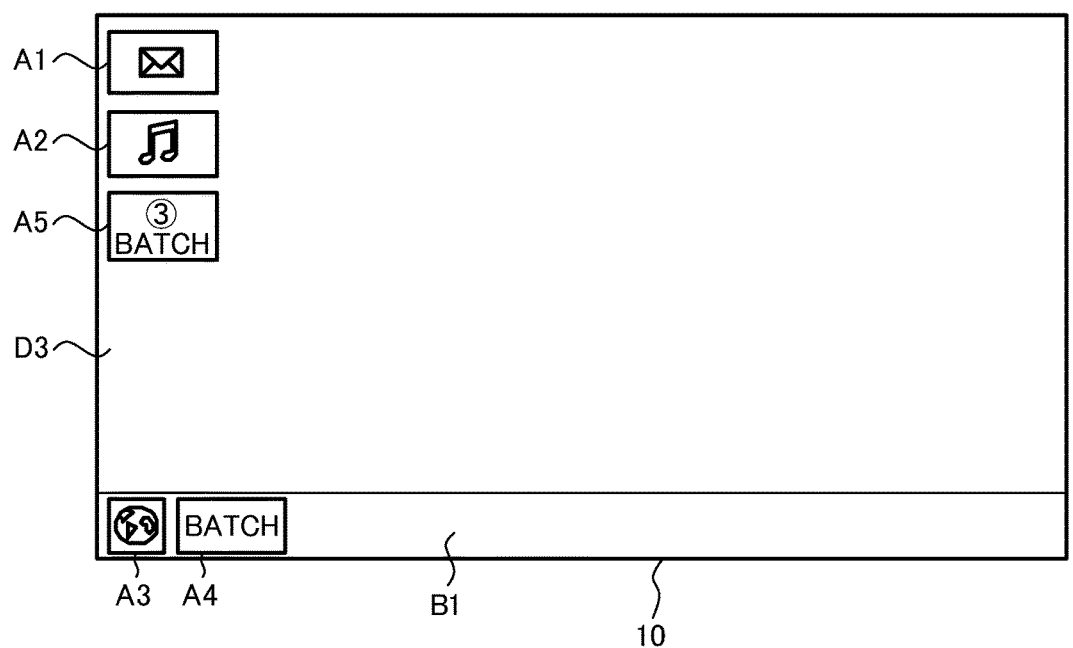
FIG. 5 is a view showing an example of an operation screen displayed on the display section.
Figure 6A:
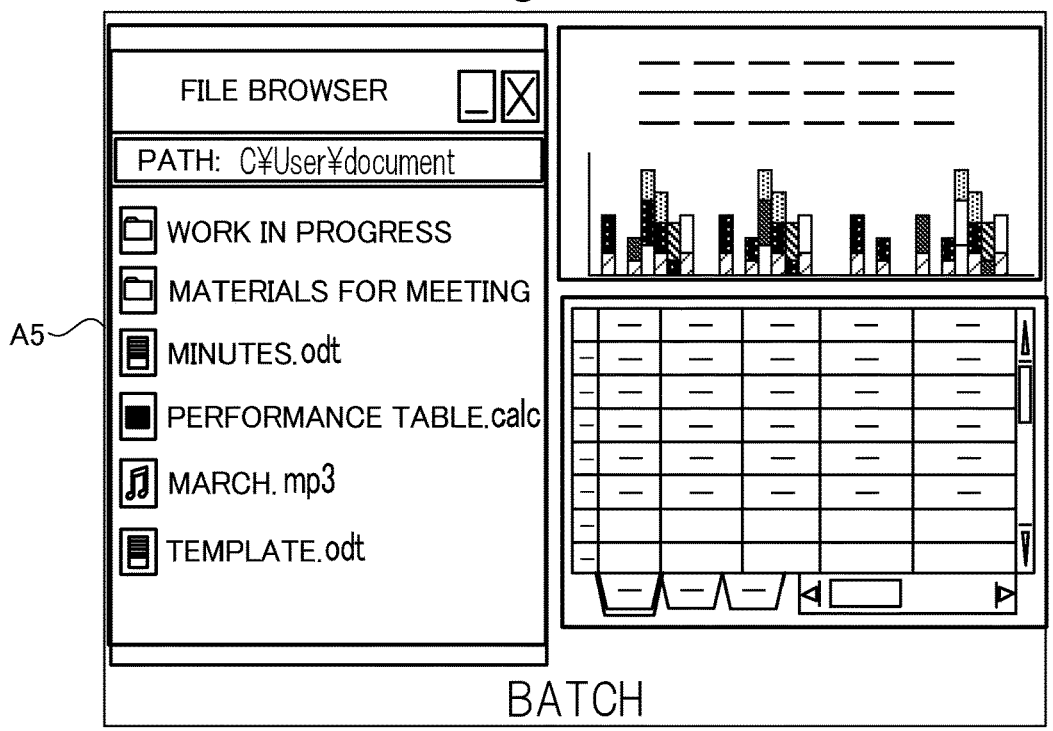
FIGS. 6A and 6B are views showing examples of icons displayed on the display section.
Figure 6B:
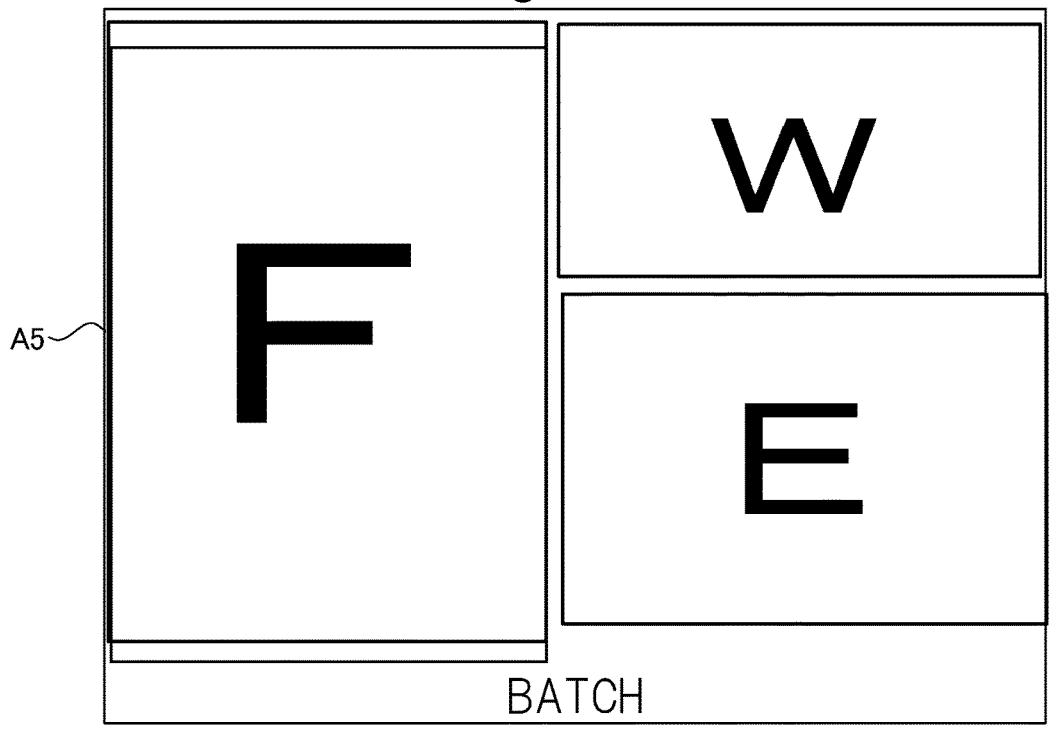

Thereafter, the control section 101 creates an icon for batch-executing these files (S3), terminates the display of the windows W1 to W3 (S4), and then allows the display section 10 to display the created icon (S5). FIG. 5 is a view showing an example of an operation screen displayed on the display section 10. An icon A5 disposed on an operation screen D3 is for batch-executing the afore-mentioned files and has a word "BATCH" representing a batch execution and a figure "3" representing the number of files. Alternatively, under the control of the control section 101, the icon A5 may be displayed on the display section 10 in a manner shown in FIG. 6A or a manner shown in FIG. 6B. In an example shown in FIG. 6A, unlike the case shown in FIG. 5 where "3" representing the number of files is simply indicated in the icon, three windows that will be displayed if these files are batch executed are displayed on the display section 10. Thus, the user can know at first sight what windows will be displayed on the display section 10 upon selection of the icon A5. Alternatively, in FIG. 6B, simple images representing the types of the files are displayed in the respective icons on the display section 10. In an example shown in this figure, a single-letter image "W" representing a document file, a single-letter image "E" representing tabular data, and a single-letter image "F" representing a folder are displayed. According to this display, even if the icon is small, the user can know what types of windows will be displayed on the display section 10 upon selection of the icon A5.

Figure 7:
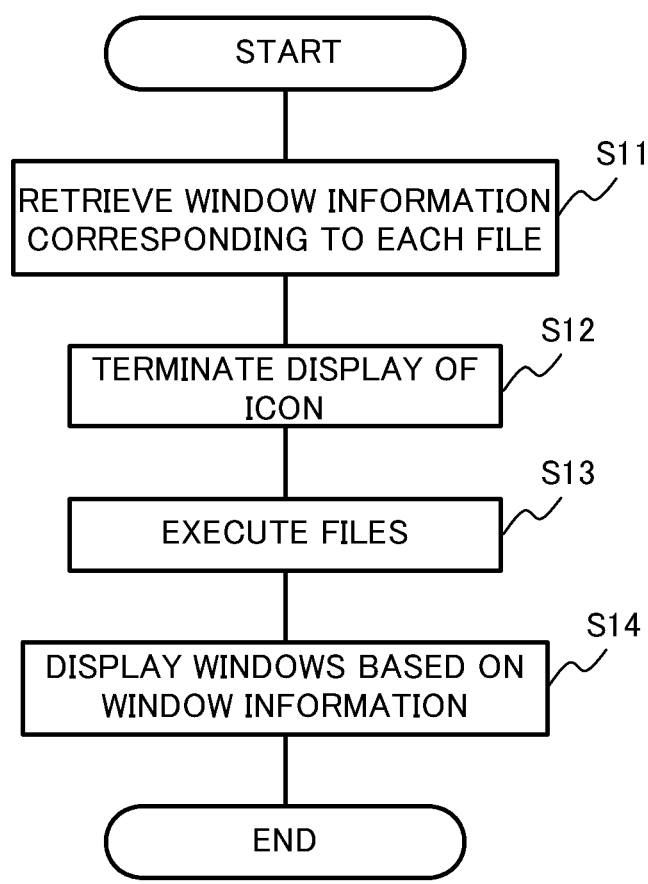
FIG. 7 is a flowchart showing a processing operation to be performed by the control unit of the information processing apparatus.

Next, a description will be given of a processing operation when a launch gesture on the icon A5 (see FIG. 5) being displayed on the display section 10 is made, with reference to a flowchart shown in FIG. 7.

When the gesture acceptance section 102 accepts a launch gesture on the icon A5, the control section 101 retrieves from the storage section 40 the respective pieces of window information associated with the files to be batch executed with the icon A5 (S11).

Thereafter, the control section 101 terminates the display of the icon A5 (S12), then allows the files to be executed (S13), and allows the display section 10 to display the files in windows having the sizes and positions based on the retrieved pieces of window information (S14). Specifically, when a file is a document file created using a word processing program, the control section 101 executes the word processing program to open the file in a window and then adjusts the size and position of the window based on the window information.

Figure 8:
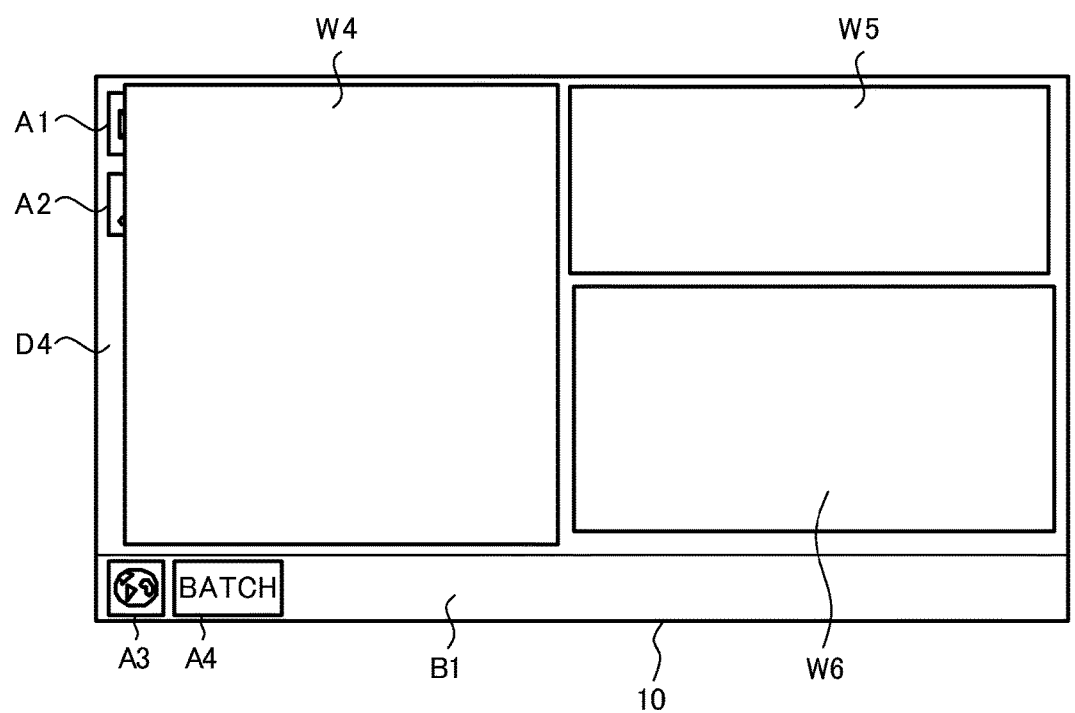
FIG. 8 is a view showing an example of an operation screen displayed on the display section.

FIG. 8 is a view showing an example of an operation screen displayed on the display section 10. Windows W4 to W6 arranged on an operation screen D4 are those displayed when a launch gesture on the icon A5 has been made, and the windows W4 to W6 are arranged in the same sizes and positions as the windows W1 to W3 shown in FIG. 2B.

<Supplement 1>

The above description has been given of the case where there are a plurality of windows being displayed on the display section 10 when the gesture acceptance section 102 accepts a launch gesture on the icon A4. Unlike this, consideration will be given below of the case where there is a single window being displayed on the display section 10 when the gesture acceptance section 102 accepts a launch gesture on the icon A4.

In this case, the control section 101 allows the storage section 40 to store window information indicating the size and position of the single window being displayed on the display section 10. Then, the control section 101 creates an icon for executing this file and allows the display section 10 to display the icon.

Thereafter, when the gesture acceptance section 102 accepts a launch gesture on the above icon, the control section 101 retrieves the window information from the storage section 40. Then, the control section 101 allows the display section 10 to display a window for displaying the file associated with the icon in the size and position indicated by the window information.

<Supplement 2>

Consideration will next be given of the case where when the gesture acceptance section 102 accepts a launch gesture on the icon A5, the contents of the associated file have been changed from those at the time of creation of the icon A5.

The control section 101 determines whether or not the contents of the file have been changed from those at the time of creation of the icon A5. If the contents of the file have been changed, the control section 101 allows the display section 10 to display a selection screen for accepting a selection of whether the contents of the file before having been changed or the contents of the file after having been changed are to be displayed.

Then, if through the selection screen the gesture acceptance section 102 accepts an instruction to select that the contents of the file before having been changed are to be displayed, the control section 101 allows the display section 10 to display a window for displaying the file having the contents before having been changed in the size and position indicated by the window information. On the other hand, if through the selection screen the gesture acceptance section 102 accepts an instruction to select that the contents of the file after having been changed are to be displayed, the control section 101 allows the display section 10 to display a window for displaying the file having the contents after having been changed in the size and position indicated by the window information.

Since the control section 101 performs processing in the above manner, the user can select which is to be displayed, the contents of the file at the creation of the icon A5 or the contents of the file at the present time, so that the contents of the file as desired by the user can be displayed on the display section 10.

<Supplement 3>

The control section 101 may allow the storage section 40 to store, as the window information, not only the size and position of each window but also the location in the file being currently displayed in the window. Then, when the gesture acceptance section 102 accepts a launch gesture on the icon, the control section 101 allows the display section 10 to display a window in which the file associated with the icon is displayed from the location in the file indicated by the window information.

For example, when the icon A5 is created while line 10 to line 50 of a text file are displayed within a window, the storage section 40 stores information indicating line 10 to line 50 as the location in the file being displayed in the window. Thereafter, when a launch gesture on the icon A5 is made, the control section 101 displays the text file, not from line 1 thereof, but from line 10 to line 50 thereof in a window.

When in a general apparatus a user closes a window and then opens the window again, the user needs to readjust the size and position of the window. This work for readjusting the size and position of the window is troublesome for the user and non-user-friendly.

In contrast, since in this supplement the above processing is performed, the work efficiency when a window is closed and then opened again can be further improved.

<Supplement 4>

When there is a window overlapped with another window on the display section 10, the control section 101 may allow the storage section 40 to store as the window information not only information indicating the respective sizes and positions of the plurality of windows but also information indicating an anteroposterior relation in overlap between the overlapped windows.

In this case, if the window information contains information indicating an anteroposterior relation in overlap between the plurality of windows when the gesture acceptance section 102 accepts a launch gesture on the icon A5, the control section 101 allows the display section 10 to display a plurality of windows for displaying the plurality of files in the sizes and positions indicated by the window information and display them with one window overlapped with another based on the information indicating the anteroposterior relation in overlap between the overlapped windows. By performing the processing as thus far described, the size and position of each window and the overlapping of windows at the creation of the icon can be reproduced.

Second Embodiment

Next, a description will be given of an information processing apparatus according to a second embodiment into which an information processing program is installed. Although in the first embodiment the description has been given of the case where the icon A5 (see FIG. 5) for batch-executing two or more files is created and displayed and a launch gesture on the icon A5 is made on the information processing apparatus 1 where the icon A5 has been created, the second embodiment is different from the first embodiment in that a launch gesture on the icon A5 is made on an information processing apparatus different from the information processing apparatus 1 where the icon A5 has been created.

Figure 9:
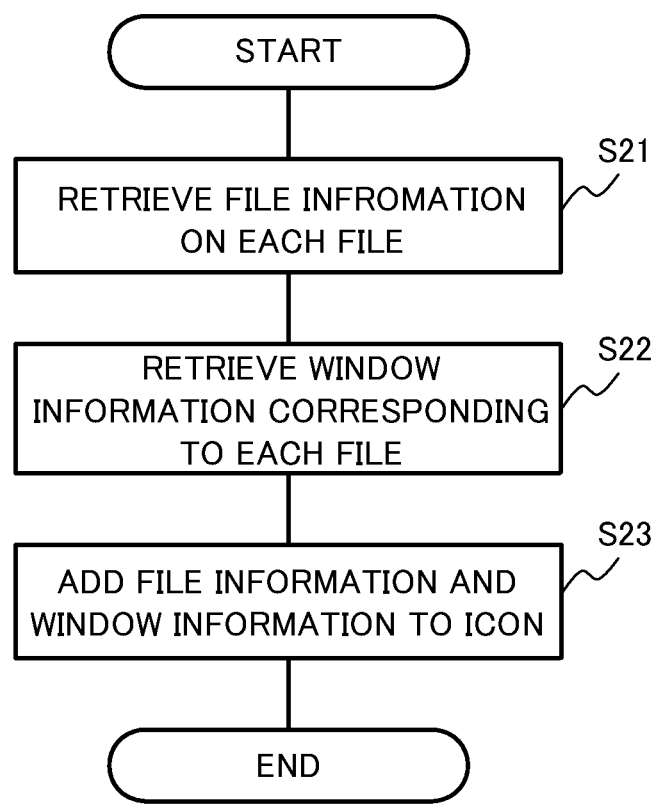
FIG. 9 is a flowchart showing a processing operation to be performed by the control unit of the information processing apparatus.

First, a description will be given of a processing operation when the icon A5 being displayed on the display section 10 is sent to another information processing apparatus, with reference to a flowchart shown in FIG. 9.

When the gesture acceptance section 102 accepts a request to send the icon A5 to another information processing apparatus (for example, when the work for attaching the icon A5 to a mail is performed), the control section 101 retrieves from the storage section 40 respective pieces of file information on the files to be batch executed with the icon A5 (S21), retrieves respective pieces of window information associated with the files from the storage section 40 (S22), and adds the retrieved file information and window information to the icon A5 (S23).

When the mail with the icon A5 attached thereto is then sent to the other information processing apparatus, the other information processing apparatus as a destination of the mail can also likewise batch-execute the two or more files with a launch gesture on the icon A5.

Figure 10:
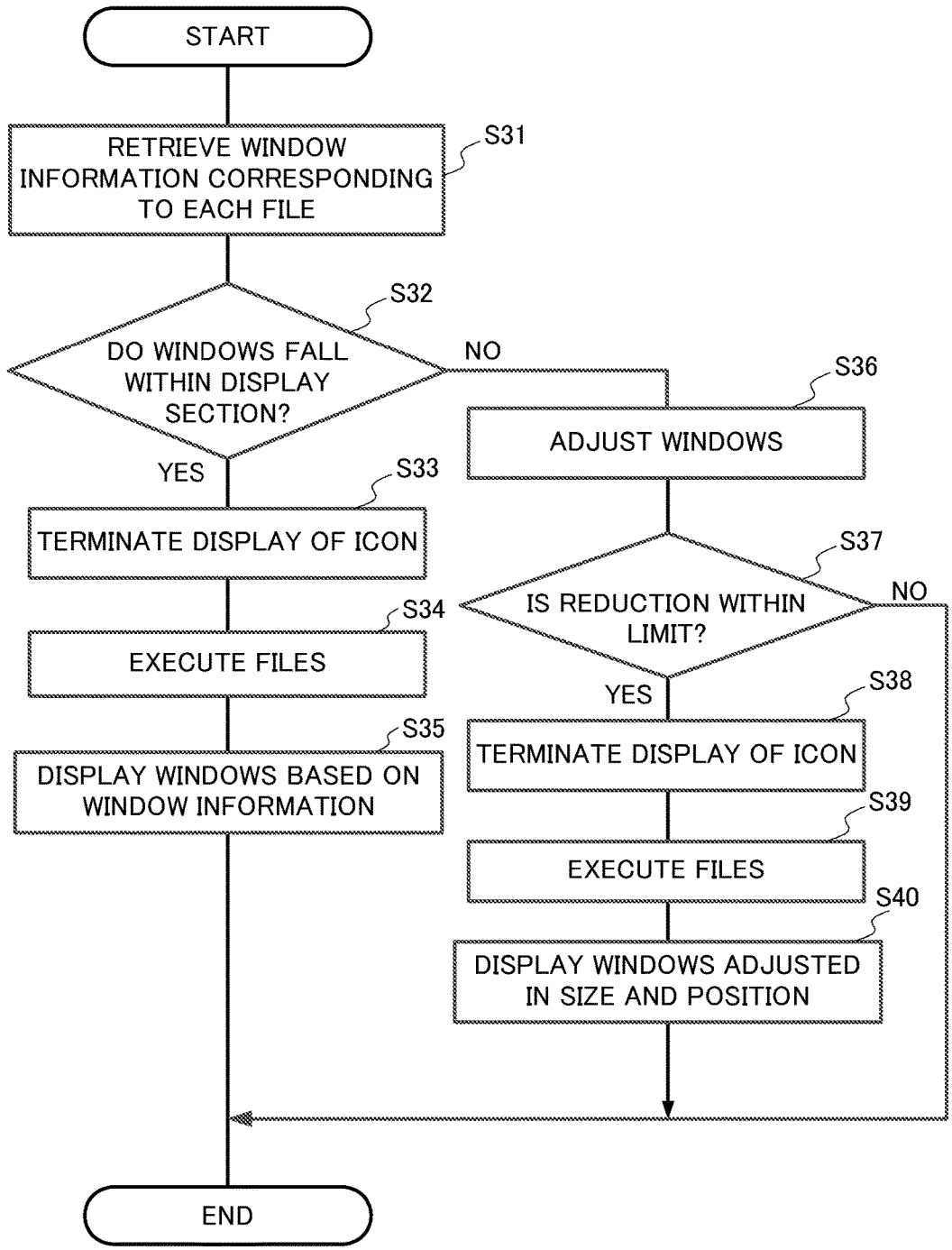
FIG. 10 is a flowchart showing a processing operation to be performed by the control unit of the information processing apparatus.

Next, a description will be given of a processing operation when a launch gesture on the icon A5 being displayed on the display section 10 is made, with reference to a flowchart shown in FIG. 10.

When the gesture acceptance section 102 accepts a launch gesture on the icon A5, the control section 101 retrieves from the storage section 40 the respective pieces of window information associated with the files to be batch executed with the icon A5 (S31) and determines, based on the retrieved pieces of window information, whether or not each window falls within the display section 10 (S32). The reason for this determination is that when the source of creation of the icon A5 is another information processing apparatus, the display section 10 of an information processing apparatus where the icon A5 has been launched may have a smaller size than the other information processing apparatus or may have a different aspect ratio, so that each window may not fall within the display section 10.

If it is determined that each window falls within the display section 10 (YES in S32), the control section 101 terminates the display of the icon A5 (S33), then allows the files to be executed (S34), and allows the display section 10 to display the files in windows having the sizes and positions based on the retrieved pieces of window information (S35).

Figure 11A:
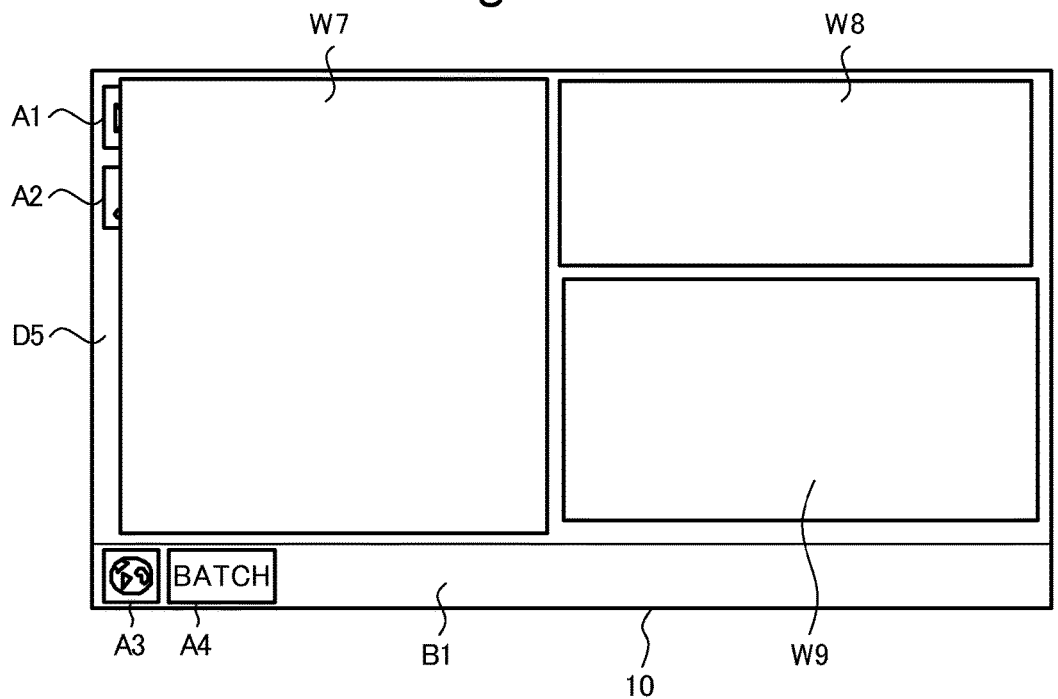
FIGS. 11A and 11B are views showing examples of an operation screen displayed on the display section.
Figure 11B:
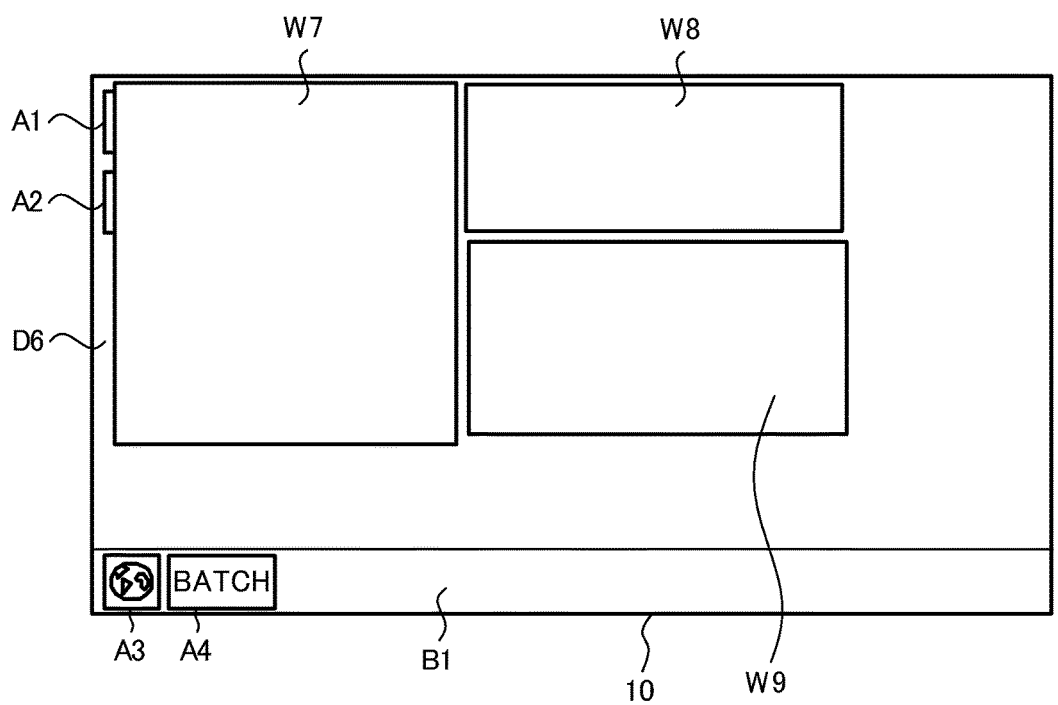

FIG. 11 shows examples of an operation screen displayed on the display section 10, wherein FIG. 11A represents the case where the display section 10 has the same size as that of a source of creation of the icon A5 and FIG. 11B represents the case where the display section 10 has a greater size than that of the source of creation of the icon A5. Windows W7 to W9 arranged on operation screens D5, D6 are those displayed when a launch gesture on the icon A5 has been made, and the windows W7 to W9 are arranged, with the top left corner of the screen as a reference point, in the same sizes and positions as the windows W1 to W3 shown in FIG. 2B. Note that the windows W7 to W9 are those created by the launch of different files.

Figure 12:
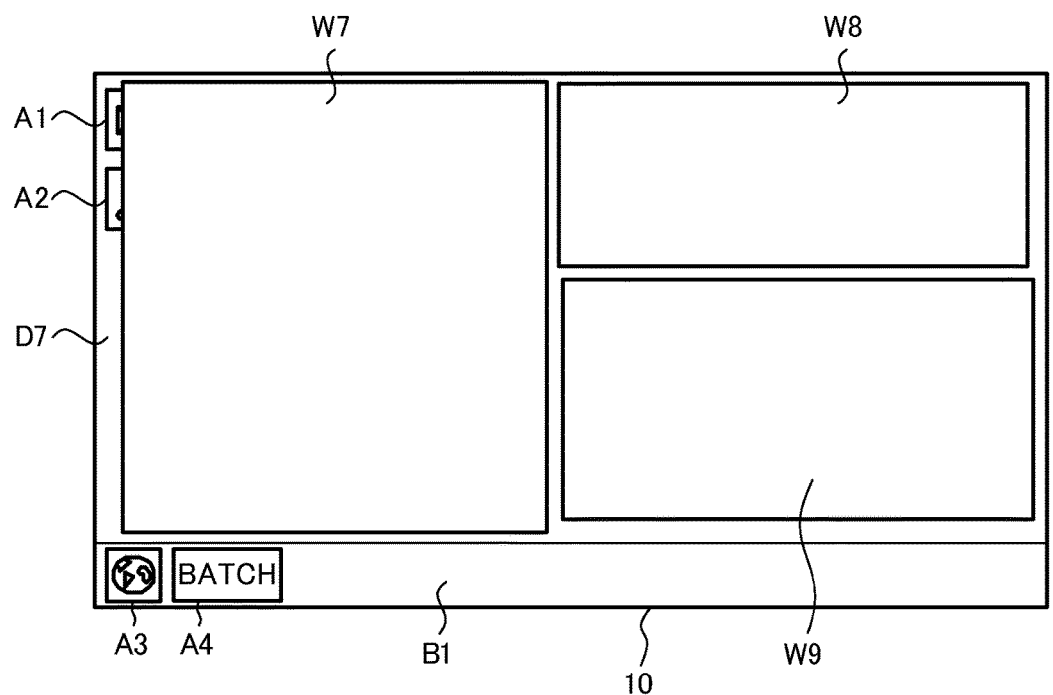
FIG. 12 is a view showing an example of an operation screen displayed on the display section.

In this embodiment, the description has been given of the case where the windows W7 to W9 are arranged to have the same sizes and positions as the windows W1 to W3. However, in another embodiment, if the control section 101 determines that the display region of the display section 10 has enough room for the windows W7 to W9, the control section 101 may extend the windows W7 to W9 (make a similar extension on them) to arrange the windows W7 to W9 over the entire display section 10, as in an operation screen D7 shown in FIG. 12.

Figure 13A:
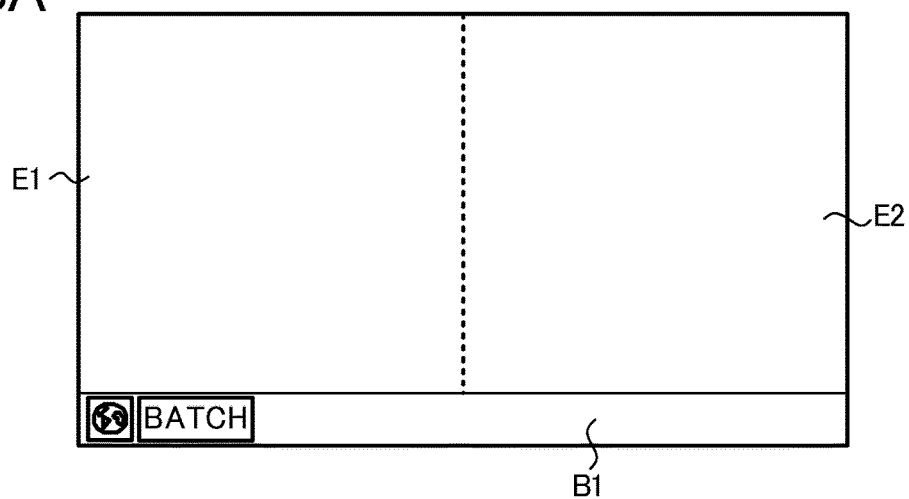
FIGS. 13A to 13C are explanatory views for illustrating a method for adjusting the sizes and positions of windows.
Figure 13B:
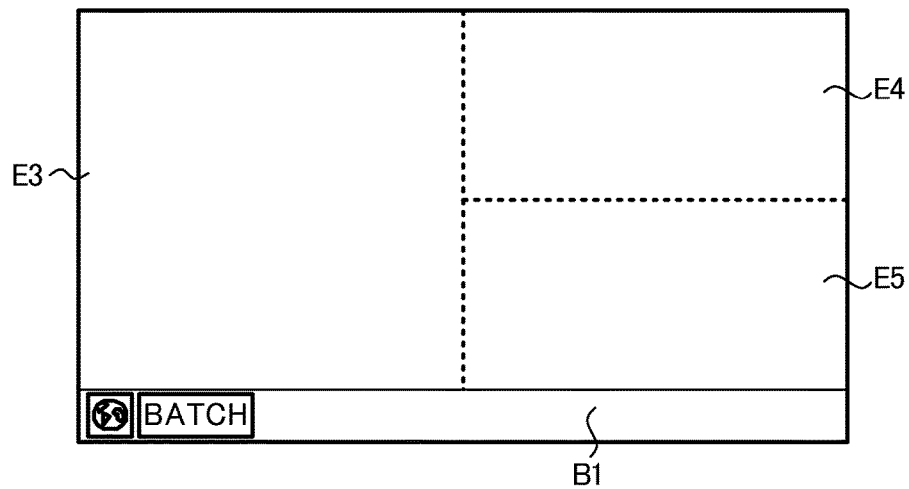
Figure 13C:
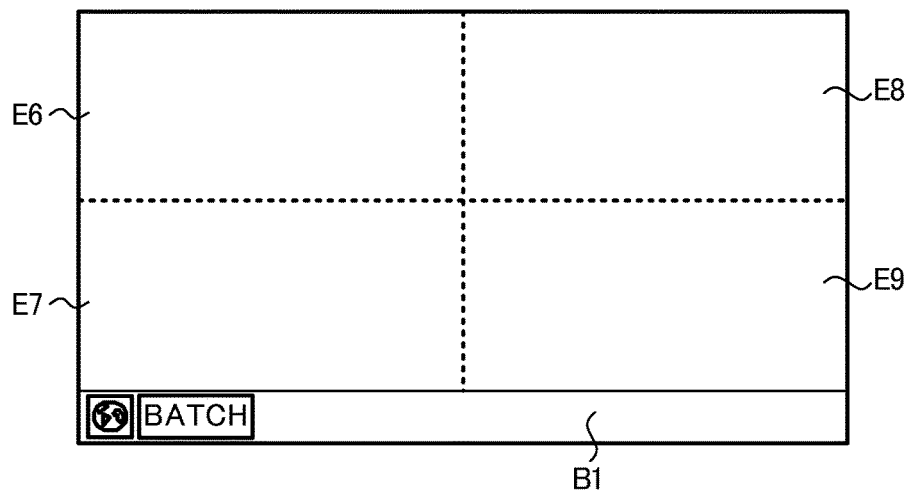
Figure 14:
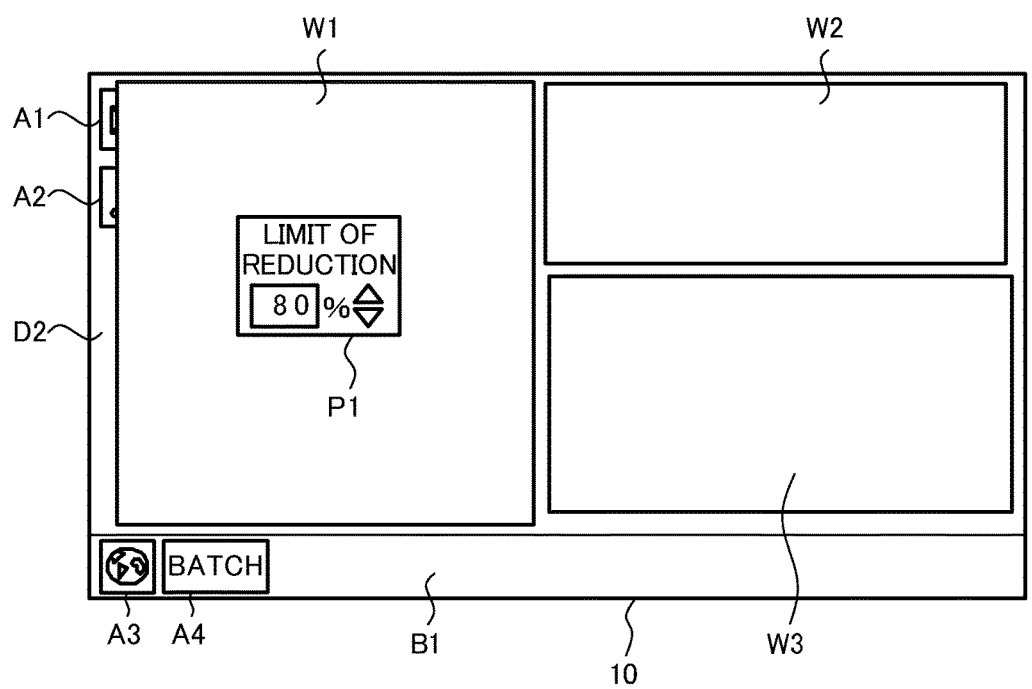
FIG. 14 is a view showing an example of an operation screen displayed on the display section.

On the other hand, if the control section 101 determines that there is any window extending beyond (not falling within) the display section 10 (NO in S32), the control section 101 adjusts the size and position of each window so that the windows fall within the display section 10 without overlaps (S36). For example, when there are two files to be batch executed, regions E1, E2 obtained by, as shown in FIG. 13A, evenly dividing the screen into right and left halves except for a task bar B1 are assigned for windows. When there are three files to be batch executed, regions E3 to E5 obtained by, as shown in FIG. 13B, dividing the screen into three parts except for the task bar B1 are assigned for windows. When there are four files to be batch executed, regions E6 to E9 obtained by, as shown in FIG. 13C, evenly dividing the screen into four parts except for the task bar B1 are assigned for windows.

The assignment of windows has only to be made in consideration of the sizes and positions of the windows before being adjusted. For example, if the layout of windows before being adjusted is a layout as shown in FIG. 2B, the window W1 is assigned to the region E3, the window W2 is assigned to the region E4, and the window W3 is assigned to the region E5.

Next, the control section 101 determines whether or not the size of each window after being adjusted is within a predetermined limit of reduction (for example, 80% or more of the original size) (S37). If determining that the size of each window is within the limit of reduction (YES in S37), the control section 101 terminates the display of the icon A5 (S38), then allows the files to be executed (S39), and allows the display section 10 to display the files in respective windows having the adjusted sizes and positions (S40). On the other hand, if determining that the size of each window after being adjusted is not within the limit of reduction (NO in S37), the control section 101 does not allow the files to be executed.

According to the second embodiment, two or more files can be batch executed and can be displayed, on the display section 10, in respective windows having sizes and positions based on the previously registered window information. In other words, the display of windows can be reproduced in a previously registered layout.

Meanwhile, in a general apparatus, windows are sometimes adjusted in size and position in accordance with user's preference in order to improve the work efficiency. Particularly, in the case where two or more windows are open, this tendency is evident. However, if two or more windows are closed and then opened again, there arises a problem that the sizes and positions must be readjusted, which reduces the work efficiency.

As a solution to this problem, a technique is conceivable for creating an icon for batch-executing two or more files. However, when the icon is launched on an information processing apparatus different from an information processing apparatus where the icon has been created, the display of the windows may not be able to be reproduced in the same layout as when the icon has been created, because of a difference in size or aspect ratio between the display sections of these different information processing apparatuses.

Unlike the above, in this embodiment, if there is any window extending beyond the display section 10 because of a difference in size or aspect ratio from the other display section, windows are adjusted in size and position to fall within the display section 10. Therefore, even if the layout cannot be reproduced, two or more files can be batch executed and appropriately displayed in windows.

The limit of reduction of windows may be set depending on the file type (the type of program for creating the file). For example, document files created using a word processing program have a lot of characters. If the document files are significantly reduced in size, the characters become very difficult to see. Therefore, the limit of reduction in this case may be set at a value as large as 80%. Files created using a presentation program or the like are less affected in visibility even by significant size reduction and, therefore, their limit of reduction may be set at 60%.

When in still another embodiment the gesture acceptance section 102 accepts a launch gesture on the icon A4 shown in FIG. 2B, the control section 101 may allow the display section 10 to display a screen P1 where the limit of reduction can be input for each of the windows W1 to W3 in this order and may allow the user to set the limit of reduction for each window. When the gesture acceptance section 102 accepts a user's input, the control section 101 may store information on the input limit of reduction as attribute information for the window information. In adjusting the sizes and positions of the windows, the control section 101 may use the stored attribute information.

The present disclosure is not limited to the configurations of the above embodiments and can be modified in various ways. For example, when in the first embodiment the gesture acceptance section 102 accepts a launch gesture (the predetermined gesture) on the icon A4 being displayed on the display section 10, the control section 101 may allow the storage section 40 to store, together with the window information, background information that indicates an image of a wallpaper being displayed on the display section 10, attributes of other icons being displayed on the display section 10 (inclusive of file names associated with the icons and images of the icons), and the positions of the icons.

Thereafter, when the gesture acceptance section 102 accepts a launch gesture on the icon A5, the control section 101 retrieves the window information and the background information from the storage section 40. The control section 101 allows the display section 10 to display windows for displaying the files associated with the icon and display the wallpaper indicated by the background information and the icons indicated by the background information. By the above processing, not only the windows but also the image of the wallpaper and other icons having been displayed on the display section 10 can be reproduced.

Furthermore, not only when the gesture acceptance section 102 accepts a launch gesture on the icon A4 being displayed on the display section 10 but also when the gesture acceptance section 102 accepts a gesture for shutting down the information processing apparatus 1, the control section 101 may allow the storage section 40 to store window information indicating the sizes and positions of windows being displayed on the display section 10.

Specifically, before the information processing apparatus 1 shuts down, the control section 101 allows the storage section 40 to store window information indicating the sizes and positions of windows being displayed on the display section 10 just before the shut-down and creates an icon associated with files being displayed in the windows. When the information processing apparatus 1 is booted after the shut-down, the icon created by the control section 101 just before the shut-down is displayed on the display section 10. When the gesture acceptance section 102 accepts a launch gesture on the icon, the control section 101 retrieves the window information from the storage section 40 and allows the display section 10 to display windows for displaying the files associated with the icon in the sizes and positions indicated by the window information. By performing the processing as thus far described, even when the information processing apparatus 1 is restarted after the shut-down, windows having been displayed before the information processing apparatus 1 shuts down can be reproduced with a simple operation.

Furthermore, in the second embodiment, the control section 101 may adjust the sizes and positions of the windows by making a uniform scale transformation (similar reduction) on the windows about a predetermined single point (for example, the top left corner) of the screen of the display section 10. By performing the above processing, even when the sizes and positions of the windows are adjusted, the size ratio of each window is maintained before and after being adjusted, which can reduce a feeling of strangeness given to the user.

Moreover, in the second embodiment, the control section 101 may perform processing for adjusting the size and position of each window within a range in which the positional relation between the window and the adjacent window is unchanged before and after being adjusted.

Figure 15:
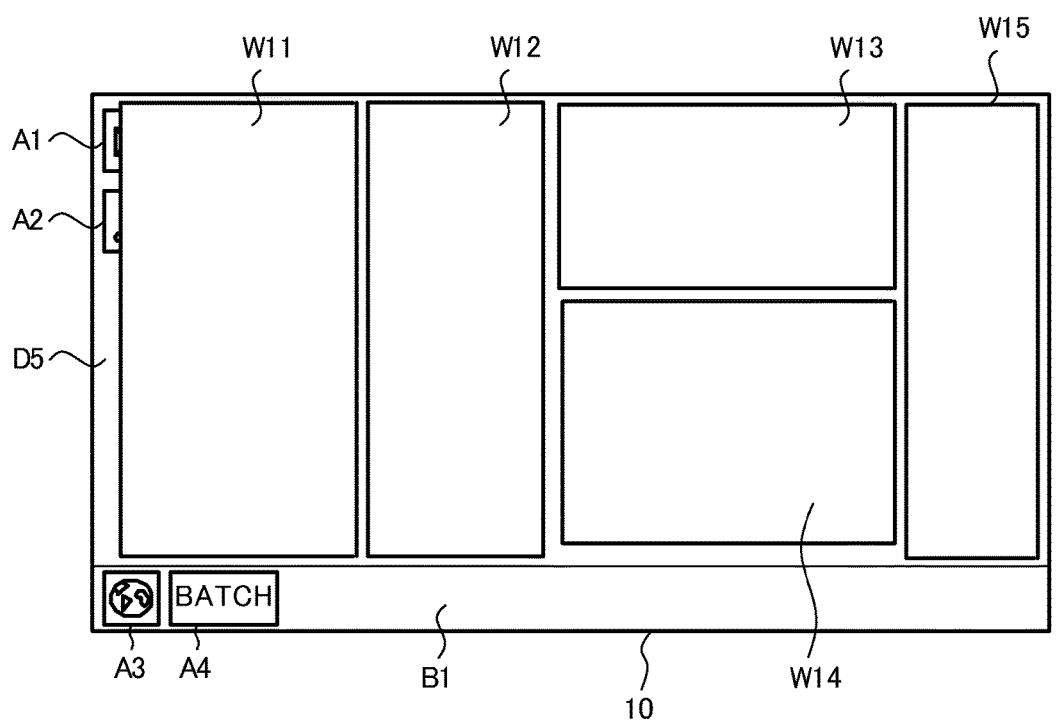
FIG. 15 is a view showing an example of an operation screen displayed on the display section.

The above processing will be described below with an example shown in FIG. 15. In the example shown in FIG. 15, five windows W11 to W15 are displayed on the operation screen D5. The control section 101 allows the storage section 40 to store adjacency relations among these windows displayed on the operation screen D5. For example, the window adjacent to the window W11 is the window W12 and the windows adjacent to the window W12 are the windows W11, W13, and W14.

The control section 101 performs the processing for adjusting the size and position of each window within a range in which the adjacency relation between the window and the adjacent window(s) is unchanged (adjacent windows are unchanged) before and after being adjusted. Specifically, the control section 101 adjusts the position and size of each window so that the window W11 does not become adjacent to the windows other than the window W12. Furthermore, the control section 101 adjusts the position and size of each window so that the windows adjacent to the window 12 become the windows W11, W13, and W14. By performing the above processing, even when the sizes and positions of the windows are adjusted, the adjacency relations among the windows are maintained before and after being adjusted, which can reduce a feeling of strangeness given to the user.

Although in the above embodiments the description has been given using a PC as one embodiment of the information processing apparatus according to the present disclosure, the PC is merely illustrative and the information processing apparatus according to the present disclosure may be any other electronic apparatus, such as a tablet terminal.

The configurations and processing shown in the above embodiments with reference to FIGS. 1 to 15 are merely illustrative of the present disclosure and are not intended to limit the present disclosure to the above particular configurations and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An information processing apparatus comprising:
a display section;
a storage section; and
a control unit that includes a processor and performs, when the processor operates in accordance with an operation program, a gesture acceptance control for accepting a user's gesture on the display section and a processing control for executing processing corresponding to the gesture accepted under the gesture acceptance control,
wherein
(i) if there are a plurality of windows being displayed on the display section when accepting a predetermined gesture under the gesture acceptance control, the control unit allows the storage section to store window information indicating respective sizes and positions of the plurality of windows being displayed on the display section, creates an icon associated with a plurality of files being displayed in the plurality of windows, and allows the display section to display the icon, and (ii) when accepting a launch gesture on the icon under the gesture acceptance control, the control unit retrieves the window information from the storage section and allows the display section to display the plurality of windows for displaying the plurality of files associated with the icon in the respective sizes and positions indicated by the window information, but
if any of the plurality of windows having the respective sizes and positions based on the window information extends beyond the display section, the control unit adjusts a size and a position of each of the plurality of windows so that the plurality of windows fall within the display section without overlapping within a predetermined limit of reduction of the plurality of windows and allows the display section to display each of the plurality of windows in the adjusted size and position, and
if it is impossible that the control unit adjusts the size and position of each of the plurality of windows so that the plurality of windows falls within the display section without overlapping within the predetermined limit of reduction, the control unit prevents the plurality of files from being executed and prevents the display section from displaying the plurality of windows.

2. The information processing apparatus according to claim 1, wherein
the control unit creates, as the icon, an icon for batch executing the plurality of files being displayed in the plurality of windows.

3. The information processing apparatus according to claim 1, wherein
when the plurality of windows being displayed on the display section include windows overlapped with one another, the control unit allows the storage section to store as the window information not only the information indicating the respective sizes and positions of the plurality of windows but also information indicating an anteroposterior relation in overlap between the overlapped windows, and
when the control unit accepts the launch gesture on the icon under the gesture acceptance control and the window information contains the information indicating the anteroposterior relation in overlap between the overlapped windows, the control unit allows the display section to display a plurality of windows for displaying the plurality of files in the respective sizes and positions indicated by the window information and display windows overlapped with one another based on the information indicating the anteroposterior relation in overlap between the overlapped windows.

4. The information processing apparatus according to claim 1,
further comprising a communication section that sends and receives data to and from another information processing apparatus,
wherein when accepting under the gesture acceptance control the predetermined gesture for sending the icon to the other information processing apparatus, the control unit allows the communication section to send file information indicating the plurality of files associated with the icon to be sent to the other information processing apparatus and window information indicating the respective sizes and positions of the plurality of windows for displaying the plurality of files.

5. The information processing apparatus according to claim 1, wherein if there are the plurality of windows being displayed on the display section when accepting the predetermined gesture under the gesture acceptance control, the control unit allows the display section to terminate the display of the plurality of windows being displayed thereon and then display the icon.

6. The information processing apparatus according to claim 1, wherein
  (i) when accepting the launch gesture on the icon under the gesture acceptance control, the control unit determines whether or not contents of the file have been changed from those at a time of creation of the icon and, if the contents of the file have been changed, allows the display section to display a selection screen for accepting a selection of whether the contents of the file before having been changed or the contents of the file after having been changed are to be displayed,
  (ii) when accepting, on the selection screen under the gesture acceptance control, an instruction to select that the contents of the file before having been changed are to be displayed, the control unit allows the display section to display a window for displaying the file having the contents before having been changed in the size and position indicated by the window information, and
  (iii) when accepting, on the selection screen under the gesture acceptance control, an instruction to select that the contents of the file after having been changed are to be displayed, the control unit allows the display section to display a window for displaying the file having the contents after having been changed in the size and position indicated by the window information.

7. The information processing apparatus according to claim 1, wherein the control unit allows the storage section to store as the window information not only the respective sizes and positions of the plurality of windows but also respective locations in the plurality of files being currently displayed in the plurality of windows and, when accepting the launch gesture on the icon under the gesture acceptance control, the control unit allows the display section to display the plurality of windows in which the plurality of files associated with the icon is displayed from the respective locations in the plurality of files indicated by the window information.

8. The information processing apparatus according to claim 1, wherein
  (i) if there are a plurality of windows being displayed on the display section when accepting the predetermined gesture under the gesture acceptance control, the control unit allows the storage section to store, together with the window information, background information indicating an image of a wallpaper being displayed on the display section and an attribute and a position of an icon being displayed on the display section, and
  (ii) when accepting the launch gesture on the icon under the gesture acceptance control, the control unit not only retrieves the window information from the storage section and allows the display section to display the plurality of windows for displaying the plurality of files associated with the icon in the respective sizes and positions indicated by the window information but also retrieves the background information from the storage section and allows the display section to display the wallpaper and the icon both indicated by the background information.

9. The information processing apparatus according to claim 1, wherein
  (i) if there are a plurality of windows being displayed on the display section when accepting a gesture for shutting down the information processing apparatus under the gesture acceptance control, the control unit, prior to shut-down of the information processing apparatus, allows the storage section to store window information indicating the respective sizes and positions of the plurality of windows being displayed on the display section and creates an icon associated with a plurality of files being displayed in the plurality of windows, and
  (ii) when the information processing apparatus is booted after the shut-down and the control unit accepts the launch gesture on the icon under the gesture acceptance control, the control unit retrieves the window information from the storage section and allows the display section to display the plurality of windows for displaying the plurality of files associated with the icon in the respective sizes and positions indicated by the window information.

10. The information processing apparatus according to claim 1, wherein the control unit performs processing for adjusting the size and position of each of the plurality of windows within a range in which a positional relation between the window and the adjacent window is unchanged before and after being adjusted.

11. The information processing apparatus according to claim 1, wherein the control unit adjusts the size and position of each of the plurality of windows by making a similar reduction on the plurality of windows about a predetermined single point of the screen of the display section.

12. A non-transitory computer-readable recording medium with an information processing program recorded thereon, the information processing program allowing a computer including a display section and a storage section to function as:
  a gesture acceptance section that accepts a user's gesture on the display section; and
  a processing section that executes processing corresponding to the gesture accepted by the gesture acceptance section,
  wherein
  (i) if there are a plurality of windows being displayed on the display section when the gesture acceptance section accepts a predetermined gesture, the information processing program allows the computer to function so that the processing section allows the storage section to store window information indicating respective sizes and positions of the plurality of windows being displayed on the display section, creates an icon associated with a plurality of files being displayed in the plurality of windows, and allows the display section to display the icon, and
  (ii) when the gesture acceptance section accepts a launch gesture on the icon, the information processing program allows the computer to function so that the processing section retrieves the window information from the storage section and allows the display section to display the plurality of windows for displaying the plurality of files associated with the icon in the respective sizes and positions indicated by the window information, but
  if any of the plurality of windows having the respective sizes and positions based on the window information extends beyond the display section, the information processing program allows the computer to function so that the processing section adjusts a size and a position of each of the plurality of windows so that the plurality of windows fall within the display section without overlapping within a predetermined limit of reduction of the plurality of windows and allows the display section to display each of the plurality of windows in the adjusted size and position, and if it is impossible to adjust the size and position of each of the windows so that each of the plurality of windows falls within the display section without overlapping within the predetermined limit of reduction, the information processing program allows the computer to function so that the processing section prevents the plurality of files from being executed and prevents the display section from displaying the plurality of windows.

13. An information processing method using an information processing apparatus including a display section and a storage section, the method comprising:

a gesture acceptance step of accepting a user's gesture on the display section; and a processing step of executing processing corresponding to the gesture accepted in the gesture acceptance step, wherein (i) in the processing step after a predetermined gesture is accepted in the gesture acceptance step while there are a plurality of windows being displayed on the display section, the storage section stores window information indicating respective sizes and positions of the plurality of windows being displayed on the display section, an icon associated with a plurality of files being displayed in the plurality of windows is created, and the display section displays the icon, and (ii) in the processing step after a launch gesture on the icon is accepted in the gesture acceptance step, the window information is retrieved from the storage section and the display section displays the plurality of windows for displaying the plurality of files associated with the icon in the respective sizes and positions indicated by the window information, but, if any of the plurality of windows having the respective sizes and positions based on the window information extends beyond the display section, a size and a position of each of the plurality of windows are adjusted so that the plurality of windows fall within the display section without overlapping within a predetermined limit of reduction of the plurality of windows and each of the plurality of windows are displayed at the display section in the adjusted size and position, and if it is impossible to adjust the size and position of each of the plurality of windows so that the plurality of windows falls within the display section without overlapping within the predetermined limit of reduction, the plurality of files are prevented from being executed and the plurality of windows are prevent from being displayed at the display section.

* * * * *